United States Patent [19]

Van Wijk et al.

[11] Patent Number: 5,473,673
[45] Date of Patent: Dec. 5, 1995

[54] SYSTEM FOR TRANSMITTING SELECTION CODE SIGNALS TO TV OR RADIO STATIONS

[75] Inventors: Paul Van Wijk, Leidschendam; Rudolf De Jager, Zoetermeer, both of Netherlands

[73] Assignee: Koninklijke PTT Nederland N.V., Groningen, Netherlands

[21] Appl. No.: 221,050

[22] Filed: Mar. 30, 1994

[30] Foreign Application Priority Data

Apr. 8, 1993 [NL] Netherlands ............... 9300619

[51] Int. Cl.⁶ ............................... H04M 11/00
[52] U.S. Cl. ..................... 379/92; 348/1; 455/2
[58] Field of Search .................. 379/92; 348/1, 348/2, 6, 12, 13; 455/2, 5.1

[56] References Cited

U.S. PATENT DOCUMENTS 4,591,906  5/1986  Morales-Garza et al. ............ 455/2
5,036,389  7/1991  Morales .

FOREIGN PATENT DOCUMENTS 0032410  7/1981  European Pat. Off. .
0402809  12/1990  European Pat. Off. .
WO91/06160  5/1991  WIPO .

Primary Examiner—Wing F. Chan
Attorney, Agent, or Firm—Frishauf, Holtz, Goodman, Langer & Chick

[57] ABSTRACT

System in which subscribers (2) are able to transmit, via the telephone network (1) and a processing system (7), selection codes to a TV or radio station (5) in response to a selection question presented in a TV or radio program using a code transmitter (6). The processing system is connected to different TV or radio stations which each transmit programs in which one or more selection questions are presented. Each of said selection questions is coded by the processing system to form a selection code which is part of a single, simple series of selection codes. Regardless of the TV station or the program, the questions can be answered by means of selection codes taken from the same series in all cases.

4 Claims, 4 Drawing Sheets

5,473,673

SYSTEM FOR TRANSMITTING SELECTION CODE SIGNALS TO TV OR RADIO STATIONS

BACKGROUND OF THE INVENTION

The invention relates to a system for transmitting and processing selection codes activated by TV or radio subscribers to form selection code signals as a response to selection questions presented in TV or radio programs, such selection codes being selected by the TV or radio subscribers, activated and emitted by means of a code transmitter, provided with a selection device, and being transmitted via a transmission network, such as a public telephone network, to a processing system connected to said transmission network.

Such a system is disclosed as a "televoting system" in an earlier Netherlands application by the Applicant, which is identified hereinbelow under heading D. The latter assumes the situation in which TV or radio subscribers are always able to make their choice (selection) known to only one TV or radio station via their code sender. In said known system, the processing device is connected to only one TV or radio transmitting system. No solution is provided for the case where there may be different stations which emit programs in which subscribers (viewers, listeners) are requested to provide their selection (for example, their preference) by means of 'televoting'.

SUMMARY OF THE INVENTION

The present invention provides a system in which subscribers are able to make their choice in different programs with the aid of a simple selection system: subscribers who are tuned to a first program make their choice from questions posed in said first program, subscribers who are tuned to a second program make their choice from questions presented in said second program, etc., this all being done, however, by making use of a simple system of selection codes no account having to be taken, in selecting the desired code, of the program of which the question presented forms part nor of the TV or radio station emitting the program.

The invention is based on the insight that simplicity of operation is provided under these circumstances if all the selection questions posed to the public in the various programs are coded by means of a simple coding, regardless of programs or stations. Which code relates to which choice is then specified in the programs themselves when the selection question is presented. These features are explained in greater detail below.

The invention therefore comprises a system as specified in the first paragraph under A. According to the invention, provision is made that the processing system is connected, directly or via other means, to a number of TV or radio stations which each emit one or more programs in which selection questions can be presented; that the selection questions forming part of the programs of the connected TV or radio stations are coded by the processing system to form simple selection codes which are part of one series of simple selection codes, the selection codes associated with the selection questions also being presented in the said programs during the presentation of said selection questions; that, for each TV or radio subscriber, the code transmitter is provided with a selection device which is designed to select such selection codes from said simple series of selection codes, such a selected selection code being capable of being activated by the subscriber to form a selection code signal; that the processing system comprises a conversion device for converting such selection codes, received as selection code signal, into response codes to said selection questions, and means for transmitting such response codes, or codes which are derived from said response codes, such as a plurality of response codes per selection question, in the form of signals to each of the connected TV or radio stations.

EXEMPLARY EMBODIMENTS

In so far as is necessary for a correct understanding, the content of the earlier application by the Applicant referred to under D. is deemed to form part of the present description.

Figure 1:
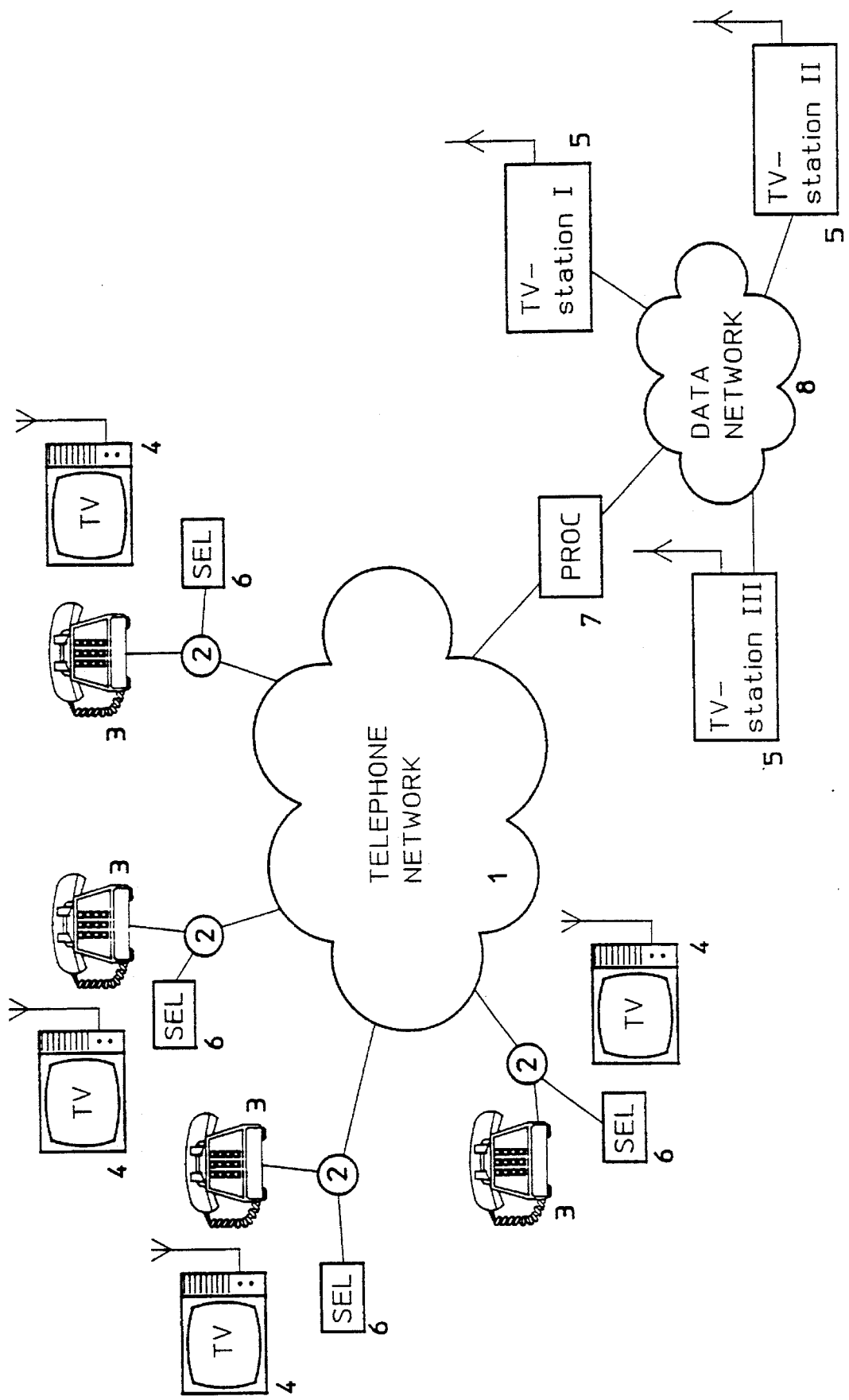
FIG. 1 shows an exemplary embodiment of a system according to the invention.

FIG. 1 shows a telephone network 1 to which a number of subscribers are connected via subscriber connections 2. The subscribers each have a telephone set 3 and a TV set 4 which can receive TV stations 5. The receiving medium is not of importance; the TV stations 5 can be received via individual "conventional" aerials or satellite aerials, via a central aerial system or via a cable-television system. Also connected to the subscriber connection 2 is a code transmitter 6 with the aid of which connection can be made to a processor 7 connected to the network 1. If a question is posed in one of the programmes emitted by the TV stations 5, the TV subscribers can respond thereto by transmitting their answer by means of their code transmitter 6. Programmes in which questions are posed to the public can be of a very varied nature. For example, in a commercial in which a certain product is presented, the public can be requested to send a particular selection code if it is desired to have further information about said product. Another example is a programme in which an opinion poll is held; the public is requested to send a first selection code if a first preference or opinion is held, a second selection code for a second preference, etc. Yet another possibility is to allow the public to take part in a game in which questions, for example, are posed to the public which can be answered by means of sending selection codes; which answers were correct can be announced later and those sending the correct answers may possibly be rewarded. It is obvious that such a "teleresponse" system offers many possibilities.

To transmit a "teleresponse" code, the code transmitter 6 makes contact with the processor 7 via the telephone network and then transmits the selected code signal. The application referred to under D in the name of the Applicant provides a method and means for preventing the telephone network 1 from being capable of becoming overloaded as a consequence of the very large number of call connections which sometimes occur in the case of such TV programs.

As a departure from what is proposed in the application referred to, the processor 7 is connected via a network 8 to more than one TV station 5 (in the example three, but in practice it may be many more); processor 7 can therefore be used for transmissions which are emitted by several TV stations 5. At the same time, however, use is made only of one processor (for example, obtainable via an "06" telephone number). According to the invention, the processor 7 allocates to the questions presented in the programs of the TV stations a selection code which belongs to one simple series of selection codes, for example the series of numbers 0 ... 99. The numbers can be generated either manually by a manager of the processor 7 or automatically by the processor 7 and passed to the TV stations 5. When the question is presented, the selection codes with the aid of which the response to the question can be given are also specified. For example, the question "Which quiz contestant in your opinion deserves the first prize: contestant A, contestant B or contestant C" is posed in a TV program emitted by TV station I; this is followed by the announcement: "You can vote for contestant A by activating selection code 34, selection code 35 is for contestant B and to vote for contestant C send us selection code 36; at the same time, however, the question "Which presidential candidate will in your opinion become President: candidate X, candidate Y or candidate Z. You can vote for candidate X by activating selection code 67, selection code 68 is for candidate Y and to vote for candidate Z, send us selection code 69" can be posed in another TV program emitted by TV station III. All the selection codes which are activated by subscribers and are sent as code signal to the processor 7 are counted by processor 7 and the result (for example, the total counts) is passed to the various TV stations (after a certain time has elapsed); the results of the questions from the 30 series are sent to TV station I and the results of the code signals received in the 60 series to TV station III. In another program of TV station I, for example, the same question may be posed at a later time than it has already been posed in a programme of TV station III, in particular the question about the most likely new President; the question can be answered (if desired) with the aid of the same codes as those with which said question could be answered in the program of TV station III, namely selection codes 67, 68 and 69. In this way, information can therefore be collected via various TV stations with the aid of the same selection codes, which is convenient for the subscribers and also for producers of programs which are emitted via different TV stations. In the preceding example, an opinion poll can be carried out in this way via all the connected TV stations by making use of the same "answer numbers" in all cases. This is certainly also of importance for producers of TV commercials; by using the same number in all cases, information can be requested about a particular product or products which are presented can even be ordered. For example, a certain product which can be ordered via selection code 42 is presented via all the connected TV stations. It will be clear that there may be a certain preference for certain selection codes on the part of the producers, just as that is at present the case with postal "answer numbers", for example code 1000 or "four times eight" etc. In allocating selection codes to TV programme makers, account can be taken of this, also in regard to the price for the use of such preference codes.

Obviously, a continuous series of letters, for example a combination of capital and small letters can be used equally as well as a continuous series of numbers. A combination of letters and figures can also be used provided that these are simple for the users (subscribers) in all cases.

The assignment of selection codes to the various TV programs (from different TV stations) can be carried out prior to the transmissions either manually or automatically, but it is also possible to request such selection codes even during the transmission from the processor 7 and then reproduce them during the transmission. It is easy to imagine that it is possible to allow the processor 7 to be dialled by the TV stations 5 (via the data network 8, but this is also possible via the telephone network 1) and to allow an automatic process to start in the processor 7 in which one or more selection codes are supplied which have not yet been reserved for "clusters of questions" in other programs (or in the same program). The selection codes allocated in this way are stored in a conversion database in the processor 7 along with the allocated selection codes, on the one hand, and the TV station question combinations, on the other. A diagrammatic example is given below of three TV stations which each emit a number of programs in which questions are posed to the viewing public; the questions are represented by the letter Q, the answers by the letter A.

| TV-I | TV-II | TV-III |
|---|---|---|
| Q1 A1 21 | Q1 A1 26 | Q1 A1 31 |
| Q1 A2 22 | Q1 A2 27 | Q1 A2 32 |
| Q1 A3 23 | Q1 A3 28 | |
| | Q1 A4 29 | Q2 A1 67 |
| Q2 A1 24 | | Q2 A2 68 |
| Q2 A2 25 | Q2 A1 37 | Q2 A3 69 |
| | Q2 A2 38 | |
| Q3 A1 34 | Q2 A3 39 | Q3 A1 43 |
| Q3 A2 35 | Q2 A4 40 | Q3 A2 44 |
| Q3 A3 36 | Q2 A5 41 | |
| | | Q4 A1 45 |
| Q4 A1 67 | Q3 A1 42 | Q4 A2 46 |
| Q4 A2 68 | | |
| Q4 A3 69 | | QS A1 42 |
| Q5 A1 42 | | |

In the summary, it can been seen that the multiple choice question Q4 of TV station 1 is the same as multiple choice question Q2 of TV station 3, namely the question about the most probable new President. In both cases response can be made by means of the selection codes 67, 68 or 69. The question in response to the product presentation is emitted by all three TV stations, namely as question Q5 on station 1, as question Q3 on station 2 and as question Q5 on station 3. In all cases, response can be made by means of selection code 42. The questions are arranged in accordance with TV station below.

| | | |
|---|---|---|
| TV-1 Q1 A1 21 | TV-2 Q1 A1 26 | TV-3 Q1 A1 31 |
| TV-1 Q1 A2 22 | TV-2 Q1 A2 27 | TV-3 Q1 A2 32 |
| TV-1 Q1 A3 23 | TV-2 Q1 A3 28 | TV-3 Q2 A1 67 |
| TV-1 Q2 A1 24 | TV-2 Q1 A4 29 | TV-3 Q2 A2 68 |
| TV-1 Q2 A2 25 | TV-2 Q2 A1 37 | TV-3 Q2 A3 69 |
| TV-1 Q3 A1 34 | TV-2 Q2 A2 38 | TV-3 Q3 A1 43 |
| TV-1 Q3 A2 35 | TV-2 Q2 A3 39 | TV-3 Q3 A2 44 |
| TV-1 Q3 A3 36 | TV-2 Q2 A4 40 | TV-3 Q4 A1 45 |
| TV-1 Q4 A1 67 | TV-2 Q2 A5 41 | TV-3 Q4 A2 46 |
| TV-1 Q4 A2 68 | TV-2 Q3 A1 42 | TV-3 Q5 A1 42 |
| TV-1 Q4 A3 69 | | |
| TV-1 Q5 A1 42 | | |

When sorted in accordance with selection code, the selection has the following appearance:

| | | |
|---|---|---|
| TV-1 Q1 A1 21 | TV-1 Q3 A1 34 | TV-3 Q3 A1 43 |
| TV-1 Q1 A2 22 | TV-1 Q3 A2 35 | TV-3 Q3 A2 44 |
| TV-1 Q1 A3 23 | TV-1 Q3 A3 36 | TV-3 Q4 A1 45 |
| TV-1 Q2 A1 24 | TV-2 Q2 A1 37 | TV-3 Q4 A2 46 |
| TV-1 Q2 A2 25 | TV-2 Q2 A2 38 | TV-1 Q4 A1 67 |
| TV-2 Q1 A1 26 | TV-2 Q2 A3 39 | TV-3 Q2 A1 67 |
| TV-2 Q1 A2 27 | TV-2 Q2 A4 40 | TV-1 Q4 A2 68 |
| TV-2 Q1 A3 28 | TV-2 Q2 A5 41 | TV-3 Q2 A2 68 |
| TV-2 Q1 A4 29 | TV-1 Q5 A1 42 | TV-1 Q4 A3 69 |
| TV-3 Q1 A1 31 | TV-2 Q3 A1 42 | TV-3 Q2 A3 69 |

| -continued | |
|---|---|
| TV-3 Q1 A2 32 | TV-3 Q5 A1 42 |

From the above summary, it is clearly evident that all the questions, whether they are presented by TV station 1, 2 or 3, are coded by means of one simple series of selection codes.

Some of the selection codes, for example the numbers 0 .... 20 in the above example, may also be reserved for expressing a particular value, for example a score. For example, the question "How many points do you think team A will get and how many points will team B get. Give the score for team A first and press the transmission button; then give the score for team B and press the transmission button" may be posed in a TV transmission.

As has already been indicated, the series of selection codes may be formed by a series of ascending numbers, for example 0 . . . 99, but also by a series of alphabetically arranged letters or letter combinations, for example A,B,C, D, . . . etc. or Aa,Ab,Ac,Ad, . . .,Ba,Bb,Bc,Bd, . . . etc. Combinations such as A1,A2,A3,A4 ,A5, . . . ,B1,B2,B3,B4, . . . etc. or 1a, 1b, 1c, . . . ,2a,2b,2 c, . . . etc. are also possible.

How the processing of the questions presented proceeds is illustrated below. Suppose that the question about the most probable new President is put to the public via TV station I. This question is specified as Q4. The answer to it may be A1, A2 or A3. After the question is presented in the program, it is added that it is possible to respond by means of selection codes 67, 68 or 69. Subscribers each select one of said codes and transmit it to the processing device 7. The dialling of the telephone number of said device 7 may be carried out independently by the selection device 6; this is even a necessity if the processing device 7 can be reached by a telephone number not known to the public as is suggested as an option in the application by the Applicant referred to. After the connection to the processor 7 has been made, the selection code, that is to say the signal corresponding to the selection code, is transmitted to the processor 7. In this example, it is unimportant who the person sending the selection code signal is. This is, however, important, for example, if the questions form part of a TV game in which subscribers who send in a "correct" answer are rewarded or if the subscriber wishes to order a product or information by means of transmitting the said selection code. The address data of the subscriber can be transmitted thereafter; these may be transmitted, for example, automatically by the selection code transmitter. After the selection code and, possibly, the more detailed address data have been transmitted, the connection is interrupted. The processor 7 converts the selection code via its database into the TV station/question/answer combination (for example selection code 68 in TV-1 Q4 A2). Then the processor 7 makes a connection to TV station I and transmits a signal signifying that one positive selection code with A2 as content has been received in response to Q4. Such a response code to TV station I has, for example, the form Q4 A2. It is more efficient if the processor 7 packages, as it were, the received selection code and transmits the packaged information to TV station I. For example, the plurality of selection codes which are received within half an hour after the presentation of the question is counted and the total counts per answer are passed to TV station I, for example in the form Q4 A1 231554, Q4 A2 134947, Q4 A3 608736. If questions were involved in which the address data also had to be received, the processor may first store all the address data received in a memory and then transmit the question/answer combination with the associated address list to TV station I. It is also possible to add a code to the selection codes already at the time of allocation, said code indicating where the data received (the totals or the address list) has to be sent and in what form (for example, hard copy, via electronic mail, via tape).

Figure 2:
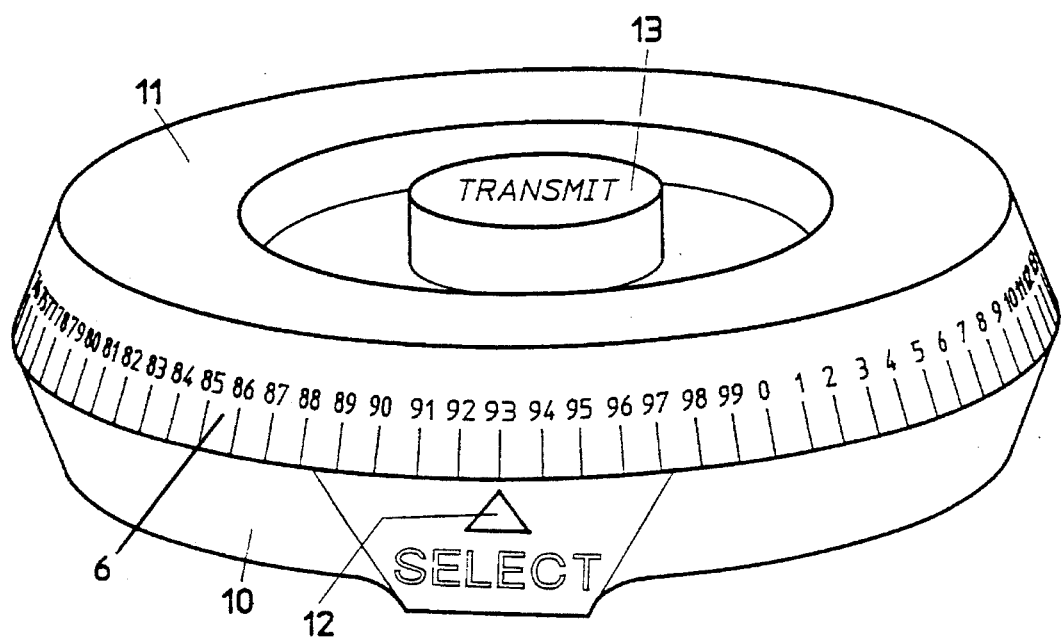
FIG. 2 shows an exemplary embodiment of the selection device.

FIG. 2 shows an embodiment of a televoting code transmitter 6, such as one which can be connected to the telephone connection 2 in parallel with the telephone set 3 via a cord, which is not shown, or possibly in a wireless manner (in the same way as a "cordless telephone"). The code transmitter 6 is formed by electronic modules such as those presented in the application by the Applicant referred to under D, and by a base 10 and a selection disk 11. The base 10 is provided with a reference arrow 12 and the selection disk 11 can be rotated in discrete steps, one of the numbers 0 . . . 99 always being situated opposite the reference arrow 12. In an obvious manner, the selection disk 11 is provided internally with a contact arm and the base 10 with one hundred fixed countercontacts, all these being connected to a DTMF generator which can be activated by a pushbutton 13 in the middle of the selector. Instead of a contact with countercontacts, a person skilled in the art will prefer the use of an embodiment in which the position of the selection disk 11 with respect to the base 10 is detected by means of BCD codes, LEDs and phototransistors. This more advanced technology has already been generally knwon since the 70's. The reference arrow 12 is provided with an LED which lights up as soon as the DTMF generator has emitted the DTMF selection code signal corresponding to the set selection code. As is explained in the application referred to, the selection code signal may, for example, be delayed or even not emitted at all (to avoid overloading of the telephone network 1); in the last case, a random sample of the activated selections is made, as it were, in a distributed manner over the activated selection devices of all the subscribers participating in the "televoting" by means of an "electronic die" and only the result of said sample is transmitted to the processor 7. In both cases, however, the said LED 12 lights up after the "televote" has been cast as an indication that the subscriber has participated in the selection process. In this connection, however, the following should be noted. As can now be envisaged, the televoting system will be used not only in applications in which it is possible to make do with a result obtained in sample fashion, such as polls and the like, but also, for example, for ordering goods or services presented during a TV program or registering to participate, for example, in a collection. In such cases, of course, use cannot be made of a method in which only a (representative) fraction of the selections made by the subscribers is actually transmitted. To avoid overloading of the telephone network, postponement (delay) of the activated selection code signals, incidently also under the control of an "electronic die", will then certainly be chosen, as a result of which all the selections (orders, registrations etc.) can be processed by the processor 7 (or the TV stations 5).

Figure 3:
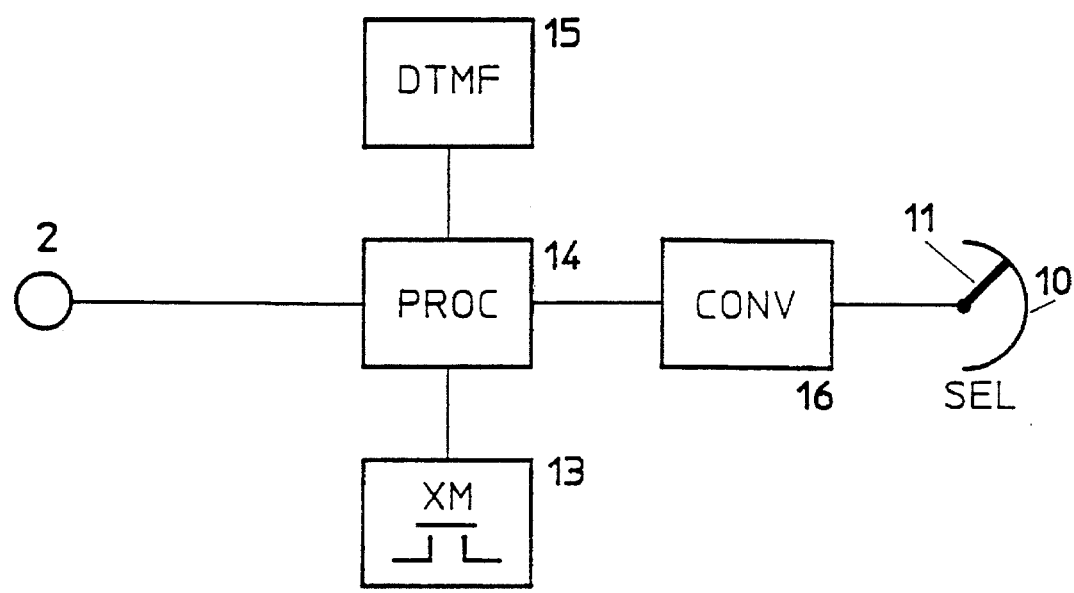
FIG. 3 shows diagrammatically a number of modules of the selection device from FIG. 2.

Finally, FIG. 3 furthermore shows diagrammatically a possible architecture for embodying the electronic modules in the selection device 6. Central to this is a processor 14 which, with the aid of a DTMF generator 15 both makes the connection to the processor 7 connected to the telephone network 1 and then emits the selection code signal to said processor 7. In response to a TV transmission which he follows on his TV set 4, the subscriber chooses a particular selection code (the applicable selection codes are communicated during said TV program or in some other manner) for example number 55, by dialling said number on the selection disk 11 opposite the reference arrow 12. He then presses the "TRANSMIT" button 13. The number 55 is read out by the processor 14 from a conversion module 16, which reads out the position of the contacts of the base 10 and the selection disk 11. Before the processor 14 is able to proceed further, it first chooses the programmed-in (and incidentally secret) telephone number of the processor 7. After the connection has been made between processor 14 (a microcomputer) and processor 7 (a computer which can be dialled via an "06" number), processor 14 is asked to transmit its selection code signal (in this case the number 55 in DTMF code) by means of a simple protocol. If desired, the address data of the subscriber can then be transmitted. Processor 14 activates DTMF generator 15 with the selection code ("55") and transmits said DTMF signal to processor 7, after which the connection is interrupted. As stated, the process preferably also comprises a "random" delay step to avoid overloading of the telephone network 1; this is adequately described, however, in the application referred to and is of no further significance for the clarity of the present invention.

Figure 4:
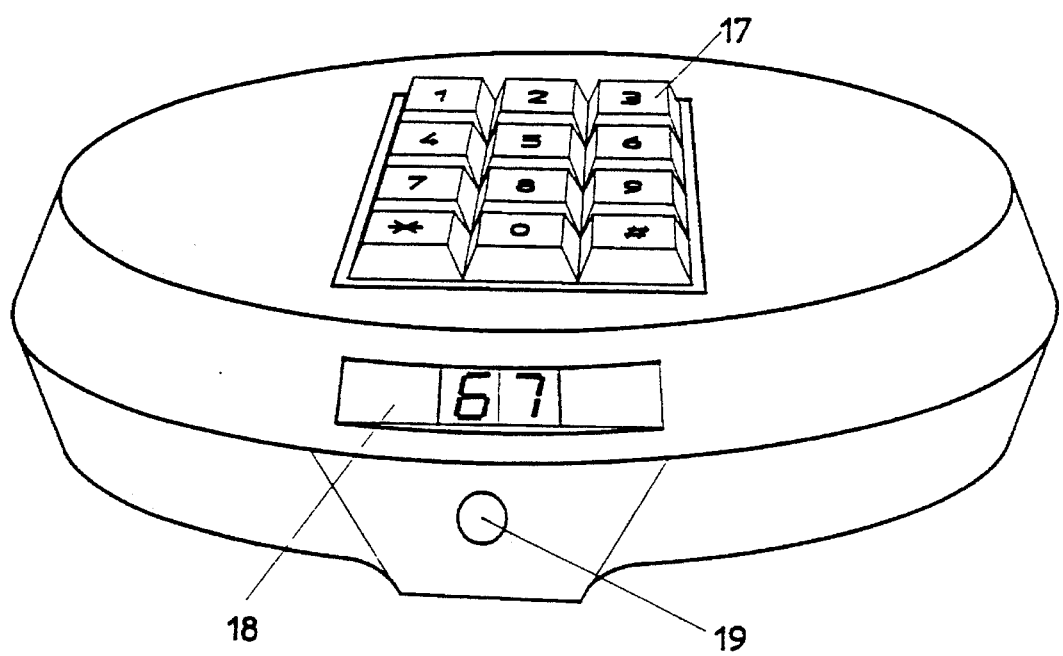
FIG. 4 shows another exemplary embodiment of the selection device.

FIG. 4 shows a code transmitter 6 with a selection device which (just as in the application by the Applicant referred to) is formed by a keyboard such as is normally used in telephone sets for entering telephone numbers. In this case, the keyboard is used to enter the desired selection code. Actual transmission can take place by then pressing the #-button, while any error can be cancelled by pressing the *-button.

REFERENCES

NL 9202106 in the name of Koninklijke PTT Nederland N.V. corresponding to U.S. application Ser. No. 08/159,724 filed Dec. 1, 1993.

We claim:

1. A system for transmitting and processing selection codes activated by TV or radio subscribers to form selection code signals as a response to selection questions presented in TV or radio programs, said selection codes being selected by the TV or radio subscribers, activated and emitted by means of a code transmitter, provided with a selection device, and being transmitted via a transmission network to a processing system connected to said transmission network, wherein:

the processing system is coupled to a number of TV or radio stations which each emit at least one program in which selection questions can be presented;

the selection questions of the at least one program of the connected TV or radio stations are coded by the processing system to form simple selection codes which are part of a single series of simple selection codes, the selection codes associated with selection questions also being presented in said at least one program during the presentation of said selection questions;

said single series of simple selection codes being the same for all of the TV or radio stations which are coupled to the processing system;

for each TV or radio subscriber, the code transmitter comprises a selection device which selects selection codes from said single series of simple selection codes, the selection codes being selected and being activated by the subscriber, responsive to a selection question, to form a selection code signal; and the processing system comprises a conversion device for converting selection codes, received as selection code signals, into response codes to said selection questions, and means for transmitting the response codes, or codes which are derived from said response codes, in the form of response signals to at least one of the TV or radio stations which are coupled to the processing system.

2. The system of claim 1, wherein said single series of simple selection codes is always associated exclusively to a same program, independent of the TV or radio station which transmits said same programs.

3. The system of claim 1, wherein said transmission network comprises a public telephone network.

4. The system of claim 1, wherein said processing system transmits a plurality of response codes per selection question, in the form of said response signals, to said at least one of the TV or radio stations which are coupled to the processing system.

* * * * *